# omitted header 3,799,907
SUSPENSION POLYMERIZATION OF STYRENE IN THE PRESENCE OF AN ANTIOXIDANT SUCH AS BISPHENOL-A
Sam H. Hastings, Baytown, Tex., assignor to Esso Research and Engineering Company
Continuation-in-part of abandoned application Ser. No. 864,993, Oct. 9, 1969. This application Aug. 16, 1972, Ser. No. 281,062
Int. Cl. C08f 1/11
U.S. Cl. 260—45.95 R          28 Claims

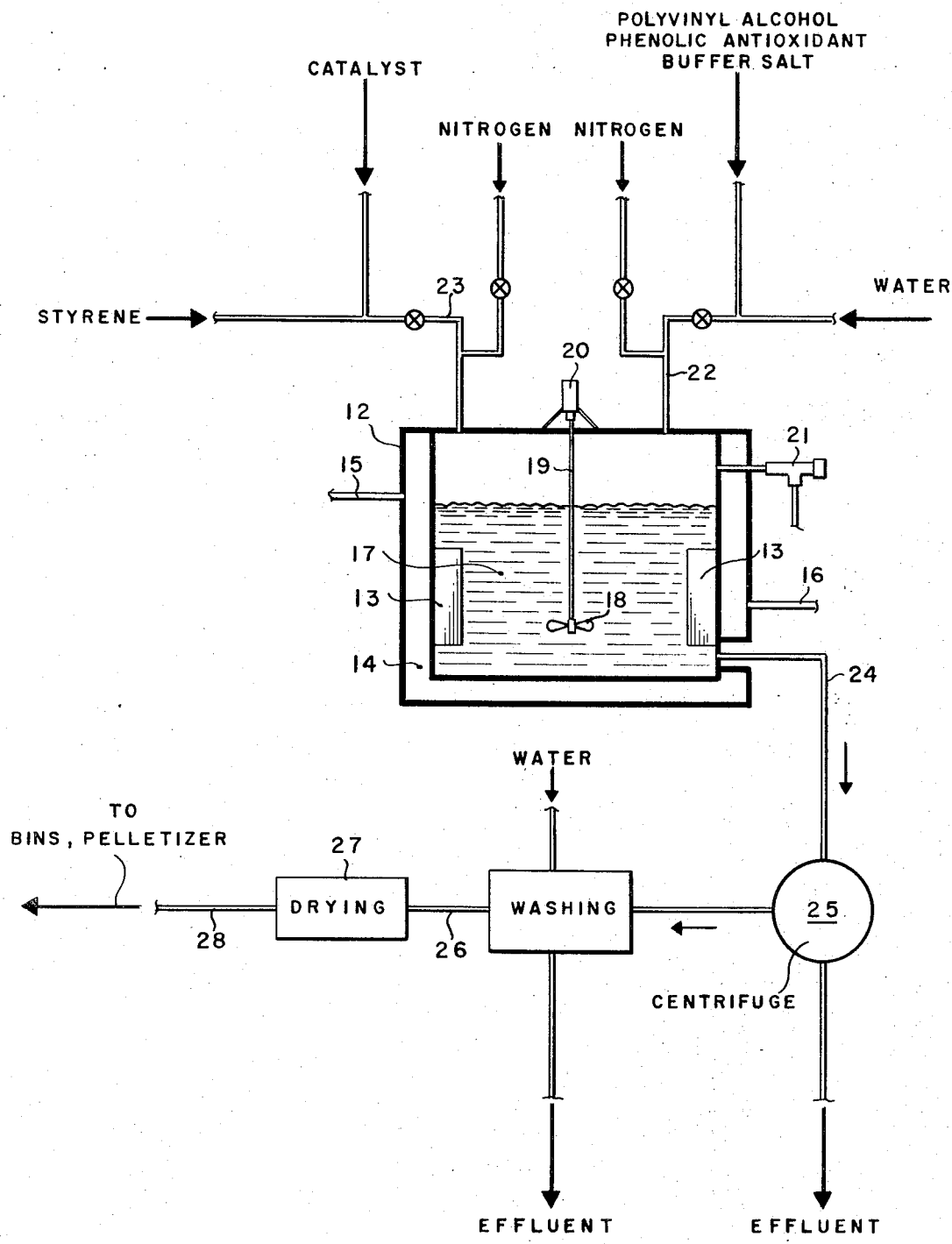

ABSTRACT OF THE DISCLOSURE

High-clarity, free-radical, suspension polymerized polymers, such as polystyrene, are prepared by a suspension polymerization process in which the suspending agent is an organic material, such as polyvinyl alcohol, and an interface antioxidant, such as a bisphenol-A, is added to the suspension. Optionally, the suspension mixture is maintained at an essentially neutral pH, as with a buffering salt of a strong base and a weak acid, e.g. sodium acetate.

RELATED APPLICATION

This is a continuation-in-part of Ser. No. 864,993, now abandoned.

BACKGROUND OF THE INVENTION

(1) Field of the invention

This invention is directed to the production of high clarity polymers such as general purpose polystyrene. More specifically, it relates to the suspension polymerization of monomers such as styrene in the presence of a carefully chosen, preferably phenolic antioxidant when organic materials such as polyvinyl alcohol are used as suspending agents. It also relates to the optional use of buffering agents, especially when certain particular suspending agents are used.

(2) Description of the prior art

Suspension polymerization is a well-known method of polymerizing styrene, vinyl acetate, methyl methacrylate, vinyl chloride and other substituted ethylenes. In this process, the monomer to be polymerized is dispersed with an oil-soluble catalyst in a system consisting usually of water and one or more suspension aids. The suspension is agitated throughout a polymerization cycle which proceeds through a viscous or a "tacky" stage, which occurs when 10 to 20 percent of the monomer has converted to polymer and which persists until about 75 to 80 percent conversion has taken place, at which point the dispersed particles become nontacky and take on a solid, bead-like appearance.

There are two commonly employed types of suspension aids for the suspension polymerization of such monomers. One type is inorganic, such as calcium phosphate, and the other type is organic, as for example, polyvinyl alcohol. With inorganic types, such as calcium phosphate, it is extremely difficult to maintain the polymerizing mass in suspension throughout the critical "tacky" stage; the pH must be very carefully controlled, or the dispersed beads of monomer and polymer mass collapse, and the run is lost.

Organic types such as polyvinyl alcohol, on the other hand, are excellent suspending agents from the standpoint of the ease with which a suspension polymerization can be carried safely beyond the "tacky" stage. However, polymers produced in a suspension polymerization using organic suspending agents such as polyvinyl alcohol have heretofore not been of "crystal" grade clarity.

Consequently, the calcium phosphate suspension system has been widely used, despite its pH sensitivity, as the system for the commercial production of "crystal" grade general purpose polystyrene, i.e., polystyrene which is suitable for molding into objects which simulate optically clear glass.

Harris, U.S. 3,186,975, and Lowell, U.S. 3,449,341, both have a generalized disclosure that antioxidants can be used. But Lowell teaches that the antioxidant is present in order that the resulting polymer have an antioxant therein. Such an antioxidant includes butylated hydroxy toluenes.

SUMMARY OF THE INVENTION

Optically clear suspension polymers using organic suspending agents, e.g. polyvinyl alcohol, are prepared by including in the suspension an antioxidant having a sufficient balance of hydrophobic and hydrophilic constituents that it resides in neither the dispersed hydrocarbon phase nor in the continuous water phase, but resides in or goes to the interface separating those phases. Optionally, a buffering agent can also be included in the polymerization system.

DESCRIPTION OF PREFERRED EMBODIMENT

It has been discovered and forms the essence of this invention that inclusion of the interface anti-oxidants in a suspension polymerization with organic suspending agents which occur at an essentially acid pH substantially reduces the haze in the resultant polymeric resin. Furthermore, when such organic suspending agents are susceptable to esterification at acid conditions, conducting the polymerization at an essentially neutral pH, i.e. within the range from about 6 to about 7.5, produces a resin, e.g. polystyrene, which has high optical clarity. pH can be controlled by utilizing certain buffering agents.

In general, the production of "crystal" grade polymers such as polystyrene by this invention involves the steps of suspending liquid monomer and a hydrocarbon soluble, free radical yielding catalyst in an aqueous medium containing minor amounts of an organic suspending agent such as polyvinyl alcohol, optionally, minor amounts of a salt of a strong base and a weak acid (buffering agent), and very minor amounts of a critically defined interface antioxidant, heating the suspension at a temperature within a range from about 60° C. to about 150° C. while mixing the suspension whereby the liquid monomer is polymerized to a solid resin; and then recovering the solid resin from the aqueous medium. Haze-producing impurities can be easily removed by a subsequent hot water washing step.

In a typical embodiment of the invention, an organic suspending agent such as polyvinyl alcohol is used in amounts within the range of from about 0.001 to about 0.005 part by weight on the monomer; from about 0.01 to about 0.1 part by weight on such monomer of a buffering agent, i.e. the salt of a strong base and a weak acid, e.g. sodium acetate (NaAc), is included with from about 0.00001 to about 0.00005 part by weight on the monomer of an interface antioxidant, e.g. bisphenol-A.

The interface antioxidant of the invention must be carefully selected so that it is poorly soluble in the reactive monomer, poorly soluble in water and has relatively the most affinity for the organic suspending agent but is not completely soluble in the suspending agent. In effect, the interface antioxidant has little affinity for either the monomer or water and a relatively greater affinity for the organic suspending agent. It is theorized and the data appear to bear this out that the interface antioxidant acts as a free-radical scavenger, preventing free-radical catalysts, i.e. peroxides, from attacking the organic modifier backbone and forming polymeric grafts on such backbone. This is particularly acute since in most instances there is a "skin" of suspending agent on the monomer globule, which forms the interface. The resulting graft polymer is highly undesirable since it appears to have an affinity for the surface of the polymer product being formed. This resulting graft layer seems to produce haze, especially since it is very difficult to remove organic suspending agents from the surface of the polymer beads.

Generally, a satisfactory interface antioxidant will have a balance of hydrophobic and hydrophilic groups sufficient to place the antioxidant at the hydrocarbon-water interface.

The preferred interface antioxidants of the invention are phenolic antioxidants, preferably bisphenol-A, but suitably 1-naphthols, 2-naphthols, 1,4-naphtholhydroquinone, or an alkylhydroquinone, e.g. trimethyl hydroquinone, or a mixture thereof.

The plurals of the terms "1-naphthol" and "2-naphthol" or the term "1- and 2-naphthols" are used herein to include those substances and the lower alkyl homologues of those substances. For example, "1-naphthols" comprehends both 1-naphthol and 4-methyl-1-naphthol. Similarly, the plural of the term "1-4-naphtholhydroquinone" is deemed to include both that substance and lower alkyl homologues of it; thus, "1-4-n-naphtholhydroquinones" is inclusive of 5,6-dimethyl, 1,4-naphtholhydroquinone as well as 1,4-naphtholhydroquinone.

Advantageously, the interface antioxidant is included in amounts within the range from about 0.00001 to about 0.00050 part by weight per part of monomer, preferably within the range of from about 0.00005 to about 0.0002 part thereof.

A wide range of organic water-soluble suspending agents known to the art can be employed in the process of the invention. These agents encapsulate the monomeric globules. While polyvinyl alcohol is preferred, other suspending agents include cellulosic derivatives such as methyl cellulose and hydroxyethyl cellulose, polyvinylpyrrolidone, polyacrylamide, polyalkylene oxides, sulfonated polystyrenes, polyacrylics, polyacrylates, combinations thereof and the like.

The problem of haze is not encountered when inorganic suspending agents are used. This tends to support the theory that primary contributors to the haze problem are the grafted by-products formed from the organic suspending agents, and that these have an affinity for the polymer product which makes them difficult if not impossible to remove by any practical techniques.

As known to the art, many suspension polymerization recipes produce an acid pH during polymerization although there are some that produce an essentially neutral pH during polymerization, i.e. within the range from about 6 to about 7.5. This acidity is believed to result from the free radical, e.g. peroxide radical by-products of the reaction, which contribute many acidic fragments to the reaction mixture.

The use of the interface antioxidant according to the technique of the invention will eliminate some of the haze in all instances and all of the haze in some instances.

It has further been found and forms an additional inventive feature that in those instances where complete haze elimination does not occur solely from the use of the interface antioxidant, it can be obtained through the use of an additional process control technique.

In essence, that technique involves maintaining the pH of the reaction mixture at an essentially neutral condition, i.e. 5.8 to 7.8, preferably 5.9 to 7.7 and most preferably 6 to 7.5.

It is theorized that the acid fragments discussed above tend to form esters with any suspending agents which have available hydroxy groups, e.g. polyvinyl alcohol in an acid environment.

But if the reaction mixture is maintained in a neutral condition as described, the tendency for ester formation is discouraged, The ester reaction products with the organic suspending agents probably contribute to haze in much the same manner posited above for the grafted suspending agent by-products.

The invention contemplates that ester formation is eliminated by a neutral reaction mixture, which can be assured by the utilization of a buffering agent, i.e. the reaction product of a strong base and a weak acid.

It is of importance to note that when the organic suspending agent has no esterifiable hydroxy groups, there is no necessity to maintain a neutral environment and consequently no requirement to use the buffering agent. Polyvinylpyrrolidinone, for example, would not require the neutral pH, and possibly the ester and ether derivatives of cellulose would not either.

Thus, if there were any doubt, the buffering agent could be screened in a particular system in order to ascertain whether it made enough of a contribution to clarity to warrant its use.

To summarize, use of interface free radical scavenger, i.e. a phenolic antioxidant in a suspension polymerization recipe which will have an acid pH during polymerization, will under all circumstances substantially reduce haze in the resin so produced. Inclusion of such antioxidant in a suspension polymerization system, utilizing a hydroxy-containing suspending agent, which system is maintained at an essentially neutral pH during polymerization, which can be assured by the inclusion of a buffering salt of a strong base and a weak acid, results in the production of a resin which is of high optical clarity.

The various ingredients in the suspension polymerization recipes and the conditions for such polymerizations are now detailed.

Monomers

All suspension-polymerizable, substituted ethylenes are included within the scope of the invention. These can be subclassed as vinyl aromatics, vinyl carbonyls and vinyl halides. Preferred species include styrene, vinylidine chloride, vinyl chloride, vinyl acetate, methyl methacrylate. Styrene is especially preferred. The substituted ethylenes can be copolymerized with themselves and/or with one or more copolymerizable monomers such as conjugated dienes, e.g. butadiene, isoprene, etc., acrylic-type compounds such as acrylonitrile, methacrylonitrile, methyl acrylate, butyl acrylate, and the like. The substituted ethylenes can also participate in graft reactions when they are reacted onto active sites on a polymer backbone.

Substituted vinyl aromatics are also within the scope of the invention. They include chlorostyrenes, alkyl styrenes, divinyl benzene, and the like.

For purposes of convenience, styrene and polyvinyl chloride are discussed as specific embodiments, but it is to be emphasized that these are merely illustrative, and the invention is not to be narrowly restricted to only these species of components.

Monomer purity

It is important that the monomer, e.g. styrene, be free of contaminants which interfere with the polymerization process and which affect the quality of the polymer produced. Suitably, one may use polymerization grade styrene such as that manufactured by Enjay Chemical Company and having the following specifications:

Form: Clear liquid, free of suspended matter
Color: 10 max. (APHA Platinum Cobalt Scale)
Assay: 99.7 min.
Polymer: 0.001% max.
Sulfur: 0.003% max.
Aldehydes: 0.01% max. (calculated as benzaldehyde)
Peroxides: 0.01% max. (calculated as hydrogen peroxide)

Chlorides: 0.01% max.
Inhibitor: 10–15 p.p.m. max. TBC (10 p.p.m. min.)

Water purity

It is sufficient to use distilled water, but preferably the water is demineralized by passing the water across a commercial ion exchange resin.

Monomer/water ratio

Desirably, for reasons of economy, as high a monomer/water ratio as practical is utilized. Advantageously, the ratio is no less than about 0.2 and preferably, it is within the range from about 0.5 to about 1.

Suspending agents

Polyvinyl alcohol is the especially preferred suspending agent used in this invention. Such agents are in concentrations of from about 0.1 to about 0.5 part, preferably about 0.25 part, per 100 parts of monomer. Suitably, one may use polyvinyl alcohol having an 86 mol percent degree of hydrolysis and an intrinsic viscosity, as determined in a 4 percent solution of water at 20° C., of 40 centipoise.

Suspension stabilizers

Various surface active agents which do not impart color to the product may optionally be used. Preferably, the surface active agent is a commercial lecithin (a mixture of acetone-insoluble phosphatides consisting of phosphatidyl choline, phosphatidyl ethanolamine, phosphatidyl serine, and phosphatidyl inositol, as well as triglycerides, fatty acids, and carbohydrates). The licithin serves to stablize the dispersion of monomer in the aqueous medium and aids in the production of more uniform beads of a desired (because more easily handled) particle size of about 20–40 mesh.

Catalysts, reaction time and temperature

The free radical producing catalysts which are used in this process are soluble in hydrocarbons. Preferably, the catalyst is an organic peroxide, although some azo catalysts can be used and dialkyl peroxydicarbonates can be used in some instances. Examples of organic peroxide catalysts which can be used include benzoyl peroxide, cumyl peroxide, t-butylhydroxyperoxide, di-t-butylperoxide, and other peroxy acid and hydroperoxides. Azo catalysts may suitably be azo-N,N'-bis-isobutyronitrile, dimethyl-N,N'-azodiisobutyrate, N,N'-azobis (2,4-dimethylvaleronitrile) and N,N'-azodiisobutyramide.

The average molecular weight and molecular weight distribution of a polymer made according to the process of the invention will depend upon the particular catalyst used, its concentration, the reaction time, the temperature at which the polymerization is conducted, and the presence of modifiers, i.e., chain transfer agents, if any.

The molecular weight average and the molecular weight distribution of the polymer affects such physical properties as strength and moldability, and may be tailored, as desired, by varying the polymerization conditions and the type and concentration of catalysts and modifiers employed, in accordance with the skill of the art.

In general, however, a range of 8–20 hours is a sufficient reaction time for most commercial processes. Reaction temperatures may be within the range from about 60° C. to about 150° C. Temperature control for any temperature selected within this range is usually of paramount importance. Reaction pressure is usually that which is sufficient to maintain the suspension in the liquid phase.

Stabilizers

The inclusion of stabilizers in the polymerization mixture depends on the particular end use to which the polymer produced according to this invention will be put. For example, oxidative stabilizers generally will be necessary where the intended purpose for the polymer is fabrication into light fixtures.

Salts

A salt can be included to regulate the ionic strength of the aqueous medium for solubility control of that medium. An inorganic salt such as sodium sulfate or potassium sulfate may be used for this purpose. However, it is preferred to employ a salt of a strong base and a weak acid, for example, sodium acetate, to act as a buffer for maintaining the pH of the suspension essentially neutral, i.e., within the range from about pH 6 to about pH 7.5, as well as to serve the function of regulating the ionic strength of the aqueous medium. A great number of salts such as these are known and commercially available.

DESCRIPTION OF THE DRAWING

The single figure of the accompanying drawing is a flow diagram which schematically illustrates the preparation of high clarity polystyrene as a preferred embodiment according to the present invention.

DESCRIPTION OF THE PREFERRED EMBODIMENT

Referring to the drawing, reference numeral 12 designates a stirred tank reactor, preferably glass-lined to prevent scaling of the polymer thereon. Reactor 12 is provided with vertically disposed baffles 13 and a jacket 14 through which a temperature regulating medium may be circulated by way of lines 15 and 16. In addition, internal cooling coils (not shown) may be installed for added heat removal capacity.

The temperature regulating medium may suitably be water or steam or a commercial heat-transfer media such as the Dowtherm series of organic heat-transfer media manufactured by Dow Chemical Company. The temperature regulating medium is employed to maintain a temperature in the reaction zone 17 within the range from about 60° C. to about 150° C., preferably about 90° C.

An agitator 18 protrudes into the reaction zone 17 from a drive shaft 19 driven by a gear-head motor 20 mounted at the top of reactor 12. A pressure relief valve 21 is provided near the top of the reactor 12 of dimension sufficient to allow the polymerizing mixture to escape if the reaction goes out of control.

Introduced into the reaction zone 17 by way of line 22 is an aqueous medium containing a suspension agent, a buffering salt of a strong base and a weak acid, and an interface phenolic antioxidant. The aqueous medium is comprised of sufficient water to produce a monomer/water ratio of 0.5; from about 0.001 to about 0.005 part by weight on the monomer of polyvinyl alcohol; from about 0.01 to about 0.1 part by weight on the monomer of the salt of the strong base and the weak acid, preferably, sodium acetate; and from about 0.0001 to about 0.001 part by weight of the interface phenolic antioxidant, preferably bisphenol-A.

Introduced into reaction zone 17 by way of line 23 is a charge of liquid styrene monomer in which a free radical yielding catalyst is dissolved, preferably benzoyl peroxide, in amounts from about 0.001 to about 0.005 part by weight on the monomer. Optionally, a suspension agent such as lecithin, preferably in amounts of from about 0.00005 to about 0.0005 part, per part of styrene monomer, may be included in the styrene charge.

The agitator 18 is operated during the charge of the styrene monomer so that the monomer is dispersed in the aqueous medium to form an oil-in-water type suspension. The system is purged with nitrogen introduced into, and exhausted from, the reactor 12 by lines 22 and 23 respectively, for about 15 minutes and then pressurized to a pressure within the range from about 0 to about 50 p.s.i.g.

Then the suspension is heated to about 150° C., preferably 90° C., while agitating, until the liquid styrene monomer is substantially completely polymerized to solid polystyrene resin, a period of about 8 hours when the reaction temperature is about 90° C.

The suspension is cooled and pumped by way of line 24 to a filter 25 where the suspension is filtered, washed with hot water, and dewatered. A suitable filter may be a basket-type centrifuge or a vibrating screen.

The polystyrene beads, which may contain as much as 5–10 percent water, are then transferred by a line 26 to a dryer 27, where the beads are dried to a moisture content of about 0.1 percent. Suitably, the dryer may be a warm air rotary dryer. The dried beads are then air conveyed from the dryer by line 28 to storage bins where they are held for future operations such as pelletizing and blending or such other operations as may be desired.

The present invention will be further illustrated by the following examples, which in their particulars, are not to be taken as limiting the scope of the invention.

In these examples, a series of styrene polymerization runs were conducted according to the process described in connection with the drawing. In these runs 100 parts of styrene monomer containing from 0.25 to 0.30 part of benzoyl peroxide were dispersed in 200 parts of water containing 0.25 part of polyvinyl alcohol. Substitutions and/or additions of various substances in parts per 100 parts of styrene monomer were made in some of the runs. From these runs, the polystyrene beads which were clear and glass-like in appearance were noted to be "clear," and the beads that were not clear and which looked hazy or frosty were characterized as "frosty." Haze of the products was estimated by the transmission of a 36 mil pad at 400 millimicrons in the visible region relative to the clearest sample of the product produced.

To determine polyvinyl alcohol content of the polystyrene produced in the runs, spectrophotometric comparisons were made against Rexhall 210 polystyrene, which is free of polyvinyl alcohol and has high clarity. The relative concentrations of polyvinyl alcohol in the products were measured with an infrared spectrophotometer by utilizing the hydroxy-stretching band at 3400 cm.$^{-1}$ in the infrared spectrum.

Also, the pH of the suspension was measured after completion of polymerization and before recovery of the polystyrene beads.

Example 1

In Run A, polystyrene beads were produced in a suspension mixture containing 3 parts of sodium sulfate. In Run B, a second polymerization reaction was conducted identically as Run A, except that bisphenol-A was added in the polymerization mixture. The results of the measurements conducted on these runs are presented in Table I.

TABLE I

| Run | Changes made | Appearance of beads | Haze | Residual PVA | pH |
|---|---|---|---|---|---|
| A | None | Frosty | 0.29 | 0.270 | |
| B | Add 0.015 pts. bisphenol-A. | do | 0.10 | 0.062 | 4.0 |

As Table I illustrates, a substantial reduction in residual polyvinyl alcohol, and correspondingly, a substantial reduction in haze was brought about by the inclusion of bisphenol-A in the reaction recipe, which produced an acid pH during polymerization. However, the beads were still not clear.

Example 2

Polystyrene was produced in Run C as in Run A, except that sodium acetate was substituted for sodium sulfate. Run D was conducted identically to Run C, but with the further addition of bisphenol-A. The results of Runs C and D are presented in Table II.

TABLE II

| Run | Changes made | Appearance of beads | Haze | Residual PVA | pH |
|---|---|---|---|---|---|
| C | Substitute 4 pts. NaAc for Na₂SO₄. | Frosty | 0.21 | 0.320 | 6.5 |
| D | Substitute 4 pts. NaAc for Na₂SO₄, Add 0.015 pts. bisphenol-A. | Clear | 0.01 | 0.030 | 6.7 |

As Table II illustrates, beads that were clear as well as having low haze and low residual polyvinyl alcohol were produced by inclusion of bisphenol-A and sodium acetate in combination in a reaction recipe which, by virtue of the buffering action of the sodium acetate in it, gave rise to an essentially neutral pH during polymerization.

Example 3

In a series of runs (Runs E–G), polystyrene was produced as in Run A of Example 1, except that sodium acetate was substituted for sodium sulfate, and an oxidative stabilizer, Polygard, an alkyl aryl phosphite manufactured by Uniroyal, Inc., was included in the aqueous charge. This is not an interface antioxidant. In another series of runs (Runs H–J), polystyrene was produced as in Runs E–G, except that bisphenol-A was additionally included in the aqueous charge. The results of those runs are presented in Table III.

TABLE III

| Run | Changes made | Appearance of beads | Haze | Residual PVA | pH[1] |
|---|---|---|---|---|---|
| E | Substitute 4 pts. NaAc for Na₂SO₄, add 0.010 pts. Polygard. | Frosty | 0.06 | 0.060 | 6.6 |
| F | do | do | 0.09 | 0.061 | 6.6 |
| G | Substitute 6 pts. NaAc for Na₂SO₄, add 0.005 pts. Polygard. | do | 0.12 | 0.059 | |
| H | Substitute 6 pts. NaAc for Na₂SO₄, add 0.007 pts. Polygard, add 0.007 pts. bisphenol-A. | Clear | 0.07 | 0.025 | 6.7 |
| I | do | do | 0.02 | 0.030 | |
| J | Substitute 6 pts. NaAc for Na₂SO₄, add 0.010 pts. Polygard, add 0.015 pts. bisphenol-A. | do | 0.00 | 0.039 | |

[1] Of final suspension.

Table III illustrates that a clear polystyrene bead was obtained only when the phenolic antioxidant, bisphenol-A, was added to the polymerization recipe.

Also, it can be seen that the conventional non-interface antioxidant had only little effect on the reduction of haze. However, it did not interfere wtih the haze reduction of the interface antioxidant and could be used therewith when desired—for instance, when it is desired to add a stabilizer to the resulting polymer in situ.

In addition to bisphenol-A, 1- and 2-naphthols, 1,4-naphtholhydroquinones, and alkylhydroquinones, all of which are difficultly soluble in hydrocarbons and which contain both hydrophobic and hydrophilic groups causing them to seek a hydrocarbon-aqueous interface, are effective to produce the results herein described.

Having fully and particularly described the present invention, and having set forth the best embodiment contemplated therefor, it is understood that the present invention is not limited to the specific details set forth, but is of the full scope of the appended claims:

I claim:
1. In the suspension polymerization process for producing solid polystyrene resin, wherein liquid styrene monomer and a hydrocarbon soluble, organic free radical yielding catalyst are dispersed in an aqueous medium which contains polyvinyl alcohol, the improvement which comprises:
conducting the polymerization in the presence of a phenolic antioxidant having a sufficient balance of hydrophobic and hydrophilic constituents that it resides preferentially in the interface separating the dispersed hydrocarbon phase and the aqueous medium and not preferentially in either the dispersed hydrocarbon phase or the aqueous medium, and selected from the group consisting of bisphenol-A, 1-naphthols, 2-naphthols, 1,4-naphtholhydroquinones, and alkylhydroquinones, or mixtures thereof.

2. The process of claim 1 in which said phenolic antioxidant is present in amounts within the range from about 0.00001 to about 0.0005 part by weight per part of said monomer.

3. The process of claim 1 in which said phenolic antioxidant is bisphenol-A.

4. In the suspension polymerization process for producing solid polystyrene resin, wherein liquid styrene monomer and a hydrocarbon soluble, organic free radical yielding catalyst are dispersed in an aqueous medium which contains polyvinyl alcohol, and wherein said mixture is maintained at essentially neutral pH during polymerization of said monomer into solid resin, the improvement which comprises:
conducting said polymerization in the presence of a phenolic antioxidant having a sufficient balance of hydrophobic and hydrophilic constituents that it resides preferentially in the interface separating the dispersed hydrocarbon phase and the aqueous medium and not preferentially in either the dispersed hydrocarbon phase or the aqueous medium, and selected from a group consisting of bisphenol-A, 1-naphthols, 2-naphthols 1,4-naphtholhydroquinones, and alkylhydroquinones, or mixtures thereof.

5. The process of claim 4 in which said phenolic antioxidant is present in amounts within the range from about 0.00001 to about 0.0005 part by weight per part of said monomer.

6. The process of claim 4 in which said phenolic antioxidant is bisphenol-A.

7. The process of claim 4 in which said pH is maintained essentially neutral by inclusion of a salt of a strong base and a weak acid in said aqueous medium.

8. The process of claim 7 in which said salt is included in an amount within the range from about 0.01 to about 0.10 part by weight per part of said monomer.

9. The process of claim 7 in which said salt is sodium acetate.

10. A process for producing clear, haze-free polystyrene resin, comprising:
dispersing liquid styrene monomer, and from about 0.1 to about 0.5 weight percent on said monomer of an organic free radical yielding catalyst soluble in said monomer, into an aqueous medium containing (a) from about 0.1 to about 0.5 weight percent on said monomer of polyvinyl alcohol, (b) from about 1 to about 10 weight percent on said monomer of the salt of a strong base and a weak acid, and (c) from about 0.001 to about 0.050 weight percent on said monomer of a phenolic antioxidant having a sufficient balance of hydrophobic and hydrophilic constituents that it resides preferentially in the interface separating the dispersed hydrocarbon phase and the aqueous medium and not preferentially in either the dispersed hydrocarbon phase or the aqueous medium, and selected from the group consisting of bisphenol-A, 1-naphthols, 2-naphthols, 1,4-naphtholhydroquinones, and alkylhydroquinones, or mixtures thereof, whereby a continuous aqueous phase suspension is formed,
heating the suspension at a temperature within a range from about 60° C. to about 150° C. while agitating the suspension until the liquid styrene monomer polymerizes to a solid polystyrene resin, and
recovering the solid polystyrene resin from said aqueous medium.

11. The process of claim 10 in which said phenolic antioxidant is bisphenol-A.

12. The process of claim 10 in which said salt of a strong base and a weak acid is sodium acetate.

13. In the suspension polymerization process for producing solid polystyrene resin wherein liquid styrene monomer and a hydrocarbon soluble, organic free radical yielding catalyst are dispersed as a hydrocarbon phase in continuous phase aqueous medium which contains polyvinyl alcohol, the improvement which comprises:
conducting the polymerization in the presence of a phenolic antioxidant having a sufficient balance of hydrophobic and hydrophilic constituents that it resides preferentially in the interface separating the dispersed hydrocarbon phase and the aqueous medium and not preferentially in either the dispersed hydrocarbon phase or the aqueous medium.

14. In a suspension polymerization system for producing polymers from a suspension polymerizable monomer, wherein droplets of said monomer are dispersed in an aqueous medium, enclosed within an organic suspending agent, which forms an interface at said monomer droplet surface and polymerized with a monomer-soluble, free-radical initiator in said monomer the improved process for obtaining said polymers with greater optical clarity which comprises:
maintaining a free-radical scavenger at said interface, sufficient to significantly improve the optical clarity of said polymer, wherein said scavenger has such a balance of hydrophobic and hydrophilic constituents that it resides preferentially in said interface as opposed to said monomer and said aqueous medium.

15. The process according to claim 1 wherein said system is maintained at a substantially neutral pH of about 5.8 to 7.8.

16. The process of claim 14 wherein said scavenger is a phenolic antioxidant.

17. The process according to claim 16 wherein said system is maintained at a substantially neutral pH of about 5.8 to 7.8.

18. The process according to claim 15 wherein said pH is maintained by incorporating into said system a buffering agent comprising the salt of a weak acid and a strong base.

19. The process according to claim 14 wherein said suspending agent is polyvinyl alcohol.

20. The process according to claim 14 wherein said monomer is selected from the group consisting of styrenes, vinyl chloride, vinyl acetate and methyl methacrylate.

21. The process according to claim 20 wherein said monomer is styrene.

22. The process according to claim 16 wherein said scavenger is bisphenol-A.

23. The process according to claim 14 wherein said suspending agent has hydroxy functionality.

24. The process according to claim 23 wherein said pH is maintained at about 5.8 to 7.8 by incorporating into said system a buffering agent comprising the salt of a weak acid and a strong base.

25. The process according to claim 24 wherein said buffering agent is sodium acetate.

26. The process according to claim 18 wherein said bufferinfi agent is sodium acetate.

27. The process according to claim 14 wherein said buffering agent is sodium acetate.

28. The process according to claim 14 wherein said scavenger is present in amounts of 0.00001 to about 0.0050 part by weight per part of monomer.

References Cited

UNITED STATES PATENTS

| | | | |
|---|---|---|---|
| 3,535,249 | 10/1970 | Larson | 260—29.6 |
| 3,226,375 | 12/1965 | Greth et al. | 260—29.6 |
| 3,652,526 | 3/1972 | Bourget et al. | 260—93.5 |
| 3,627,855 | 12/1971 | Schott et al. | 260—93.5 |
| 3,624,185 | 11/1971 | Lederer et al. | 260—93.5 |
| 3,449,311 | 6/1969 | Lowell | 260—89.5 |
| 3,186,975 | 6/1965 | Harris | 260—93.5 |
| 3,493,551 | 2/1970 | Aoishi | 260—93.5 |

FOREIGN PATENTS

| | | | |
|---|---|---|---|
| 224,418 | 9/1957 | Australia | 260—93.5 |

DONALD E. CZAJA, Primary Examiner

E. C. RZUCIDLO, Assistant Examiner

U.S. Cl. X.R.

260—29.6 ME, 89.3, 89.5 R, 92.8 W, 93.5 W